United States Patent
Sugae

(10) Patent No.: US 11,280,902 B2
(45) Date of Patent: Mar. 22, 2022

(54) OBJECT DETECTION APPARATUS

(71) Applicant: AISIN CORPORATION, Kariya (JP)

(72) Inventor: Ippei Sugae, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 16/812,892

(22) Filed: Mar. 9, 2020

(65) Prior Publication Data

US 2020/0301009 A1  Sep. 24, 2020

(30) Foreign Application Priority Data

Mar. 20, 2019 (JP) .............................. JP2019-053879

(51) Int. Cl.
 *G01S 15/10* (2006.01)
 *G01S 15/58* (2006.01)
 *G01S 7/527* (2006.01)

(52) U.S. Cl.
 CPC .......... *G01S 15/101* (2013.01); *G01S 7/5273* (2013.01); *G01S 15/104* (2013.01); *G01S 15/582* (2013.01)

(58) Field of Classification Search
 CPC .... G01S 15/101; G01S 7/5273; G01S 15/582; G01S 15/104; G01S 7/527
 USPC .......................................................... 367/99
 See application file for complete search history.

(56) References Cited

U.S. PATENT DOCUMENTS 7,496,157 B2   2/2009   Katou et al.

FOREIGN PATENT DOCUMENTS

JP   2005-249770 A   9/2005

*Primary Examiner* — Daniel L Murphy
(74) *Attorney, Agent, or Firm* — Sughrue Mion, PLLC

(57) ABSTRACT

An object detection apparatus includes a transmitting portion configured to transmit a transmission wave, a receiving portion configured to receive a reception wave based on the transmission wave which returned, an estimation portion configured to estimate an amount of frequency transition between the transmission wave and the reception wave on the basis of a result of a frequency analysis, a correction portion configured to correct the reception wave to obtain consistency of frequencies with the transmission wave on the basis of an estimation result of the estimation portion, and a detection portion configured to detect information related to the object on the basis of a relation between the transmission wave and the corrected reception wave corrected by the correction portion.

12 Claims, 6 Drawing Sheets

| Code | 1 | 1 | 0 | 1 |
|---|---|---|---|---|
| Wave motion (Frequency) | W1 (f1) | W1 (f1) | W2 (f2) | W1 (f1) |

OBJECT DETECTION APPARATUS

CROSS REFERENCE TO RELATED APPLICATIONS

This application is based on and claims priority under 35 U.S.C. § 119 to Japanese Patent Application 2019-053879, filed on Mar. 20, 2019, the entire content of which is incorporated herein by reference.

TECHNICAL FIELD

This disclosure generally relates to an object detection apparatus.

BACKGROUND DISCUSSION

In a known technique, a correlation value between a transmission wave and a reception wave serving as the transmission wave that had been reflected by an object and then returned is obtained (calculated), determination is made whether or not a degree of similarity of the transmission wave and the reception wave to each other is at a level which is equal to or greater than a predetermined level on the basis of the correlation value, and a distance to the object which is one of information related to the object is detected by, for example, TOF (Time Of Flight) method on the basis of the detection result (for example, JP2005-249770A which will be referred also to Patent reference 1).

In the above-described known technique, a frequency transition due to Doppler shift may occur between the transmission wave and the reception wave. In such a case, if an amount of the frequency transition is not considered appropriately, the reception wave serving as the transmission wave which was reflected by a detection target object and then returned may not be detected accurately.

A need thus exists for an object detection apparatus which are not susceptible to the drawback mentioned above.

SUMMARY

According to an aspect of the disclosure, an object detection apparatus includes a transmitting portion configured to transmit a transmission wave based on at least two frequencies set within a range of a predetermined frequency band, a receiving portion configured to receive a reception wave based on the transmission wave which returned in response to reflection at an object, an estimation portion configured to estimate an amount of frequency transition due to Doppler shift between the transmission wave and the reception wave on the basis of a result of a frequency analysis on the reception wave and transmit frequency information indicating a relation between the at least two frequencies of the transmission wave, a correction portion configured to correct the reception wave to obtain consistency of frequencies with the transmission wave on the basis of an estimation result of the estimation portion, and a detection portion configured to detect information related to the object on the basis of a relation between the transmission wave and the corrected reception wave corrected by the correction portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment of the present disclosure will be described with reference to the drawings. The configurations of the embodiment and variations described hereunder, and the operations and results (advantages and effects) brought by the configurations are examples, and the present disclosure is not limited thereto.

Figure 1:
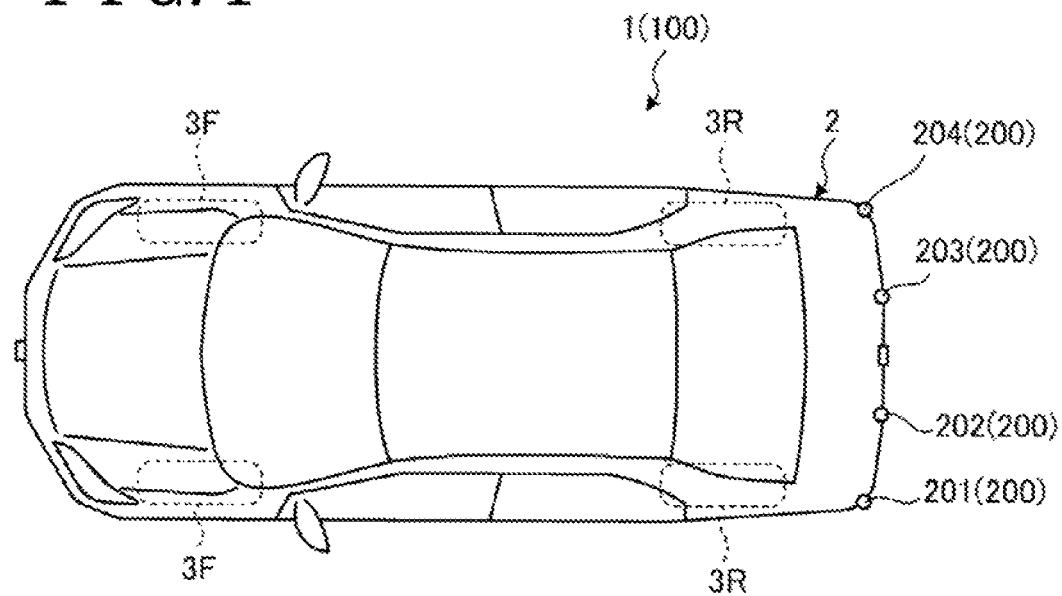
FIG. 1 is a schematic view, seen from above, illustrating an exterior of a vehicle provided with an object detection system including a distance detection apparatus according to an embodiment disclosed here.

FIG. 1 is a schematic example view, seen from above, illustrating an exterior of a vehicle 1 provided with an object detection system including a distance detection apparatus according to the embodiment. As will be described later, the object detection system according to the embodiment is an on-vehicle sensor system that performs transmission and reception of ultrasonic waves and obtains, for example, a time difference between the transmission and the reception, and thereby detecting information related to an object including a human or person existing in surroundings (for example, an obstacle O indicated in FIG. 2 which will be described later).

As illustrated in FIG. 1, the object detection system includes an ECU (Electronic Control Unit) 100 provided inside the vehicle 1, and distance detection apparatuses 201, 202, 203, 204 provided at an exterior of the vehicle 1. The vehicle 1 is provided with four wheels including a pair of front wheels 3F and a pair of rear wheels 3R. The distance detection apparatuses 201, 202, 203, 204 are examples of "object detection apparatus".

As an example, in the example illustrated in FIG. 1, the distance detection apparatuses 201 to 204 are provided at, for example, a rear bumper at a rear end of a vehicle body 2 serving as the exterior of the vehicle 1, so as to be arranged at different positions from one another.

In the embodiment, hardware configurations and functions of the respective distance detection apparatuses 201, 202, 203, 204 are identical to one another. Therefore, for the purpose of simplification, the distance detection apparatuses 201, 202, 203, 204 will be collectively referred to also as the distance detection apparatus 200 hereunder.

In the embodiment, the position where the distance detection apparatus 200 is arranged is not limited to the example illustrated in FIG. 1. For example, the distance detection apparatus 200 may be provided at a front bumper of a front end of the vehicle body 2, at a side surface or side surfaces of the vehicle body 2, or at two or more of the rear bumper, the front bumper and the side surfaces. In the embodiment, the number of the distance detection apparatus 200 is not limited to the example illustrated in FIG. 1.

Figure 2:
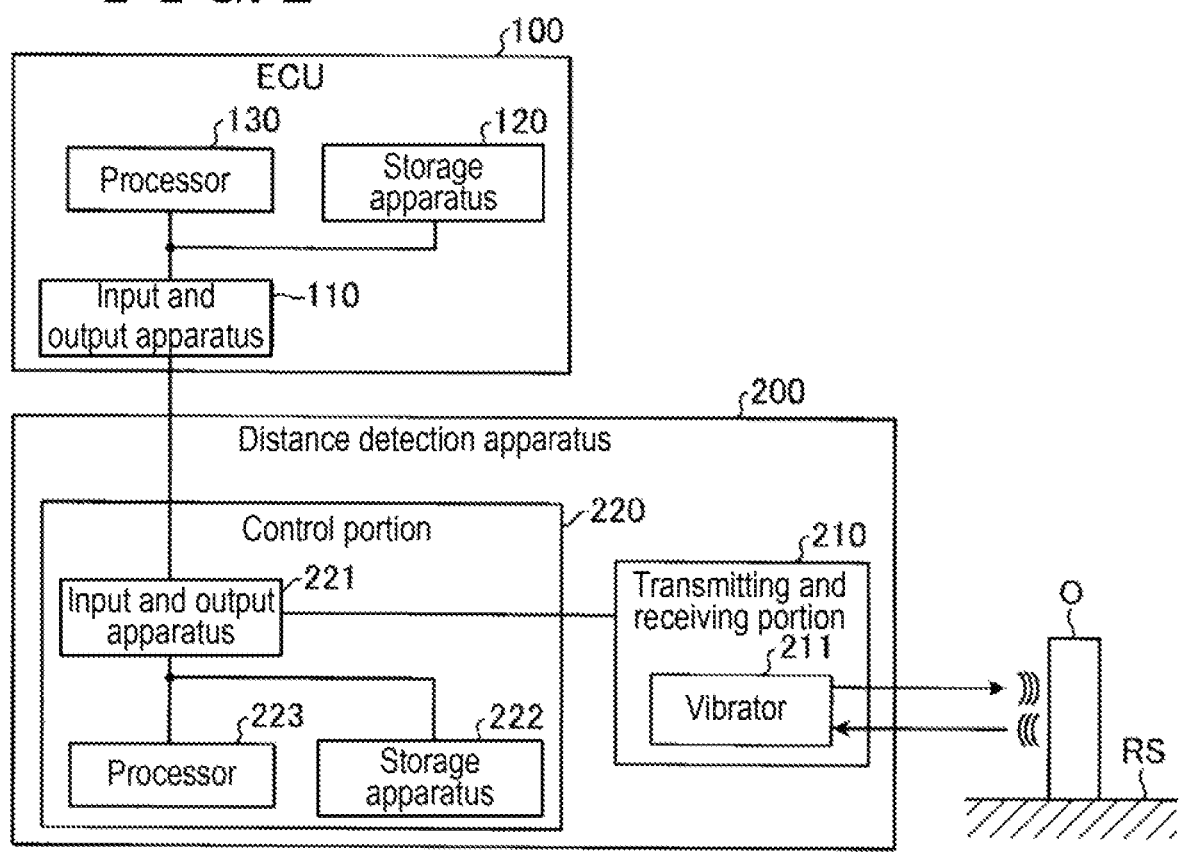
FIG. 2 is a schematic block diagram illustrating a schematic hardware configuration of an ECU (Electronic Control Unit) and the distance detection apparatus, according to the embodiment.

FIG. 2 is a schematic example block diagram illustrating a hardware configuration of the ECU 100 and the distance detection apparatus 200, according to the embodiment.

As illustrated in FIG. 2, the ECU 100 includes the hardware configuration that is similar to a usual computer. More specifically, the ECU 100 includes an input and output apparatus 110, a storage apparatus 120 and a processor 130.

The input and output apparatus 110 is an interface for realizing transmission and reception of information between the ECU 100 and an outside (the distance detection apparatus 200 in the example of FIG. 1).

The storage apparatus 120 includes a main storage including ROM (Read Only Memory) and/or RAM (Random Access Memory), and/or an auxiliary storage including an HDD (Hard Disk Drive) and/or an SSD (Solid State Drive), for example.

The processor 130 controls various processing executed in the ECU 100. The processor 130 includes an arithmetic apparatus including a CPU (Central Processing Unit), for example. For example, the processor 130 realizes various functions including autonomous or automatic parking by reading a computer program stored in the storage apparatus 120 and performing the computer program.

As illustrated in FIG. 2, the distance detection apparatus 200 includes a transmitting and receiving portion 210 and a control portion 220.

The transmitting and receiving portion 210 includes a vibrator 211 including, for example, a piezoelectric element, and realizes the transmission and reception of the ultrasonic waves with the use of the vibrator 211.

More specifically, the transmitting and receiving portion 210 transmits, as a transmission wave, an ultrasonic wave generated in response to vibrations of the vibrator 211. Then, the transmitting and receiving portion 210 receives, as a reception wave, vibrations of the vibrator 211, the vibrations which are caused in a manner that the ultrasonic wave transmitted as the transmission wave is reflected at an object existing in the outside and the reflected wave returns. In the example of FIG. 2, the obstacle O arranged on a road surface RS is illustrated as the object that reflects the ultrasonic wave from the transmitting and receiving portion 210.

According to the configuration of the example illustrated in FIG. 2, both the transmission of the transmission wave and the reception of the reception wave are realized or performed by the single transmitting and receiving portion 210 provided with the single vibrator 211. However, the technique of the embodiment is also applicable to a configuration in which a configuration of a transmitting-side and a configuration of a receiving-side are separated from each other, including a configuration in which a first vibrator for transmitting the transmission wave and a second vibrator for receiving the reception wave are provided separately from each other, for example.

The control portion 220 includes a hardware configuration that is similar to a usual computer. More specifically, the control portion 220 includes an input and output apparatus 221, a storage apparatus 222 and a processor 223.

The input and output apparatus 221 is an interface for realizing transmission and reception of information between the control portion 220 and an outside (the ECU 100 and the transmitting and receiving portion 210 in the example of FIG. 1).

The storage apparatus 222 includes a main storage including ROM and/or RAM, and/or an auxiliary storage including an HDD and/or an SSD, for example.

The processor 223 controls various processing executed in the control portion 220. The processor 223 includes an arithmetic apparatus including a CPU, for example. For example, the processor 223 realizes various functions by reading a computer program stored in the storage apparatus 222 and then performing the computer program.

The distance detection apparatus 200 of the embodiment detects a distance from the distance detection apparatus 200 to the object with the use of the technique of so-called TOF (Time Of Flight) method. As will be described in detail below, the TOF method is the technique that a distance to an object is calculated in consideration of a difference between a timing at which a transmission wave was transmitted (more specifically, a timing at which the transmission of the transmission wave started) and a timing at which a reception wave was received (more specifically, a timing at which the reception of the reception wave started).

Figure 3:
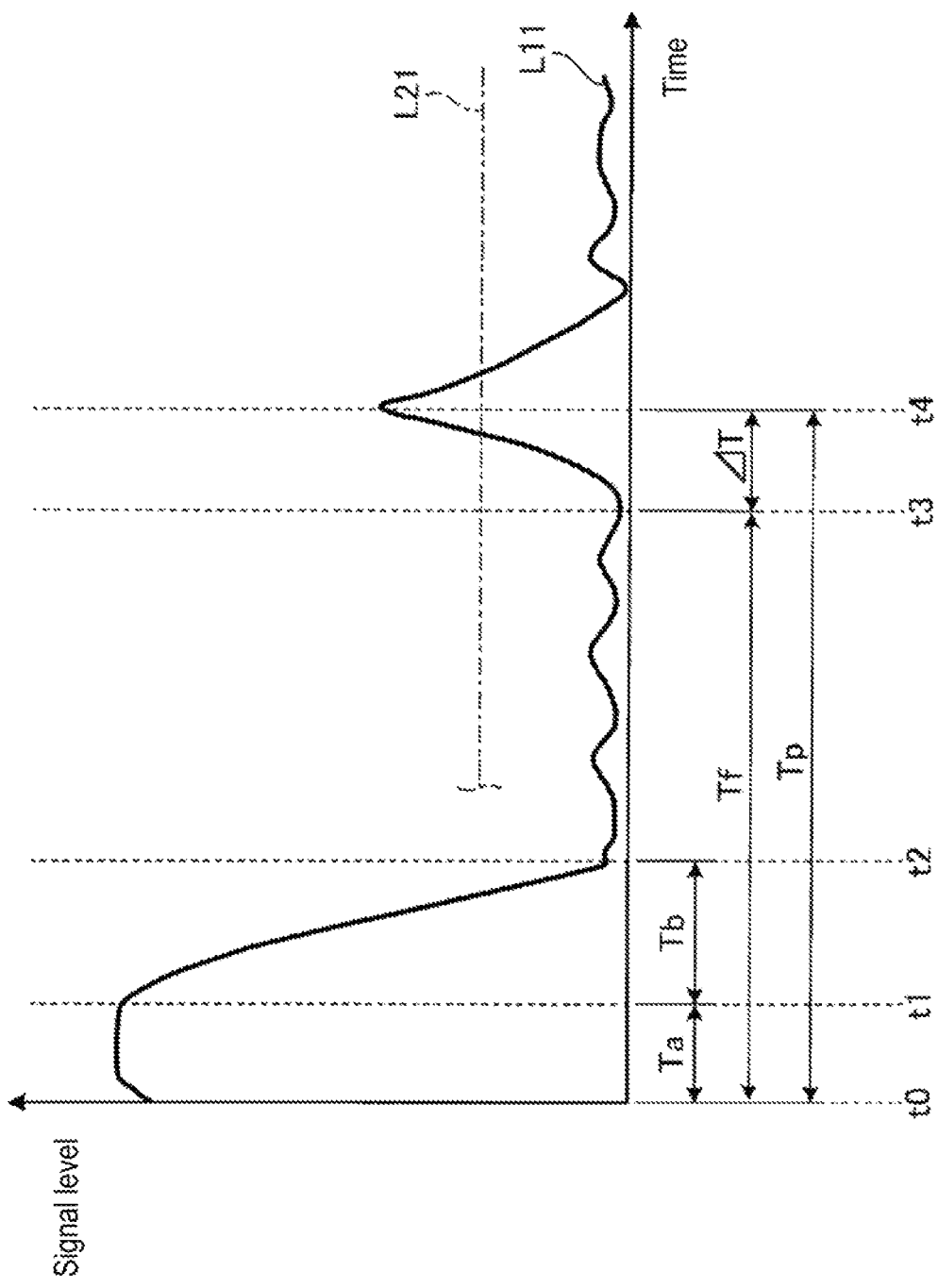
FIG. 3 is a schematic view for explaining an outline of a technique used by the distance detection apparatus according to the embodiment for detecting a distance to an object.

FIG. 3 is a schematic example view for explaining an outline of a technique used by the distance detection apparatus 200 to detect the distance to the object, according to the embodiment. More specifically, FIG. 3 is a view schematically illustrating, in a graphic form, a time change of a signal level (amplitude, for example) of the ultrasonic wave transmitted and received by the distance detection apparatus 200 of the embodiment. In the graph illustrated in FIG. 3, the horizontal axis corresponds to the time and the vertical axis corresponds to the signal level of the signal transmitted and received by the distance detection apparatus 200 via the transmitting and receiving portion 210 (the vibrator 211).

In the graph illustrated in FIG. 3, a solid line L11 indicates an example of the signal level of the signal that the distance detection apparatus 200 transmits and receives, that is, an envelope curve indicating the time change (the change over time) of a degree of vibration of the vibrator 211. It can be read from the solid line L11 that the vibrator 211 is driven and vibrates from a timing t0 for a time Ta and thus the transmission of the transmission wave is completed at a timing t1, and thereafter, the vibrator 211 keeps vibrating due to inertia for a time Tb until reaching a timing t2 while the vibration becomes attenuated or damped. Accordingly, in the graph illustrated in FIG. 3, the time Tb corresponds to so-called reverberation time.

The solid line L11 comes to a peak at a timing t4 when a time Tp has passed since the transmission of the transmission wave started at the timing t0. At the peak, the degree of vibration of the vibrator 211 exceeds (or, equals to or greater than) a predetermined threshold value Th1 indicated by an alternate long and short dash line L21. The predetermined threshold value Th1 is a value set in advance to identify or distinguish whether the vibration of the vibrator 211 results from the reception of the reception wave corresponding to the transmission wave that was reflected by a detection target object (the object which is a target of the detection, including, the obstacle O illustrated in FIG. 2, for example) and then returned, or the vibration of the vibrator 211 results from the reception of the reception wave corresponding to the transmission wave that was reflected by the object which is other than the detection target object (the road surface RS illustrated in FIG. 2, for example) and then returned.

FIG. 3 illustrates an example where the predetermined threshold value Th1 is set as a constant value that does not change or vary with time, however, the predetermined threshold value Th1 may be set as a value that changes with time in the embodiment.

Here, it can be regarded that the vibration of which the peak exceeds (or, is equal to or greater than) the predetermined threshold value Th1 results from the reception of the reception wave corresponding to the transmission wave that was reflected by the object which is the target of the detection and then returned. On the other hand, it can be regarded that the vibration of which the peak is equal to or less than (or, is less than) the predetermined threshold value Th1 results from the reception of the reception wave corresponding to the transmission wave that was reflected by the object which is other than the target of the detection and then returned.

Consequently, it can be read from the solid line L11 that the vibration of the vibrator 211 at the timing t4 is caused by the reception of the reception wave corresponding to the transmission wave that was reflected by the detection target object and returned.

According to the solid line L11, the vibration of the vibrator 211 is attenuated at and after the timing t4. Thus, the timing t4 corresponds to a timing at which the reception of the reception wave serving as the transmission wave that was reflected by the detection target object and returned is completed, in other words, the timing t4 corresponds to a timing at which the transmission wave that was transmitted lastly at the timing t1 returns as the reception wave.

According to the solid line L11, a timing t3 serving as a start point of the peak of the timing t4 corresponds to a timing at which the reception of the reception wave corresponding to the transmission wave that was reflected by the detection target object and then returned was started, in other words, the timing t3 corresponds to a timing at which the transmission wave that was firstly transmitted at the timing t0 returns as the reception wave. Consequently, according to the solid line L11, a time ΔT from the timing t3 to the timing t4 is equal to the time Ta serving as a transmission time of the transmission wave.

In the light of the above description, in order to obtain by the TOF method the distance to the object that is the target of the detection, a time Tf from the timing t0 at which the transmission wave started being transmitted to the timing t3 at which the reception wave started being received needs to be obtained. The time Tf can be obtained by subtracting the time ΔT that equals to the time Ta corresponding to the transmission time of the transmission wave, from the time Tp corresponding to a difference between the timing t0 and the timing t4 at which the signal level of the reception wave comes to the peak exceeding the threshold value Th1.

The timing t0 at which the transmission wave starts being transmitted is easily identified as a timing at which the distance detection apparatus 200 started operating. The time Ta corresponding to the transmission time of the transmission wave is predetermined by, for example, setting in advance. Accordingly, for obtaining the distance to the object of the detection target by the TOF method, it is important to identify the timing t4 at which the signal level of the reception wave reaches the peak exceeding the threshold value Th1. In order to identify the timing t4, an accurate detection of the reception wave is important, the detection wave which serves as the transmission wave that was reflected by the detection target object and then returned.

In a case where at least one of the distance detection apparatus 200 and the detection target object is moving, a frequency transition due to Doppler shift may occur between the transmission wave and the reception wave. In such a case, if an amount of the frequency transition is not considered appropriately, the reception wave serving as the transmission wave that was reflected by the detection target object and then returned may not be detected accurately.

In the embodiment, by configuring the distance detection apparatus 200 as will be described below, the reception wave serving as the transmission wave that was reflected by the detection target object and then returned is detected accurately and the distance to the object is detected accurately, even in a case where the frequency transition is caused by the Doppler shift.

Figure 4:
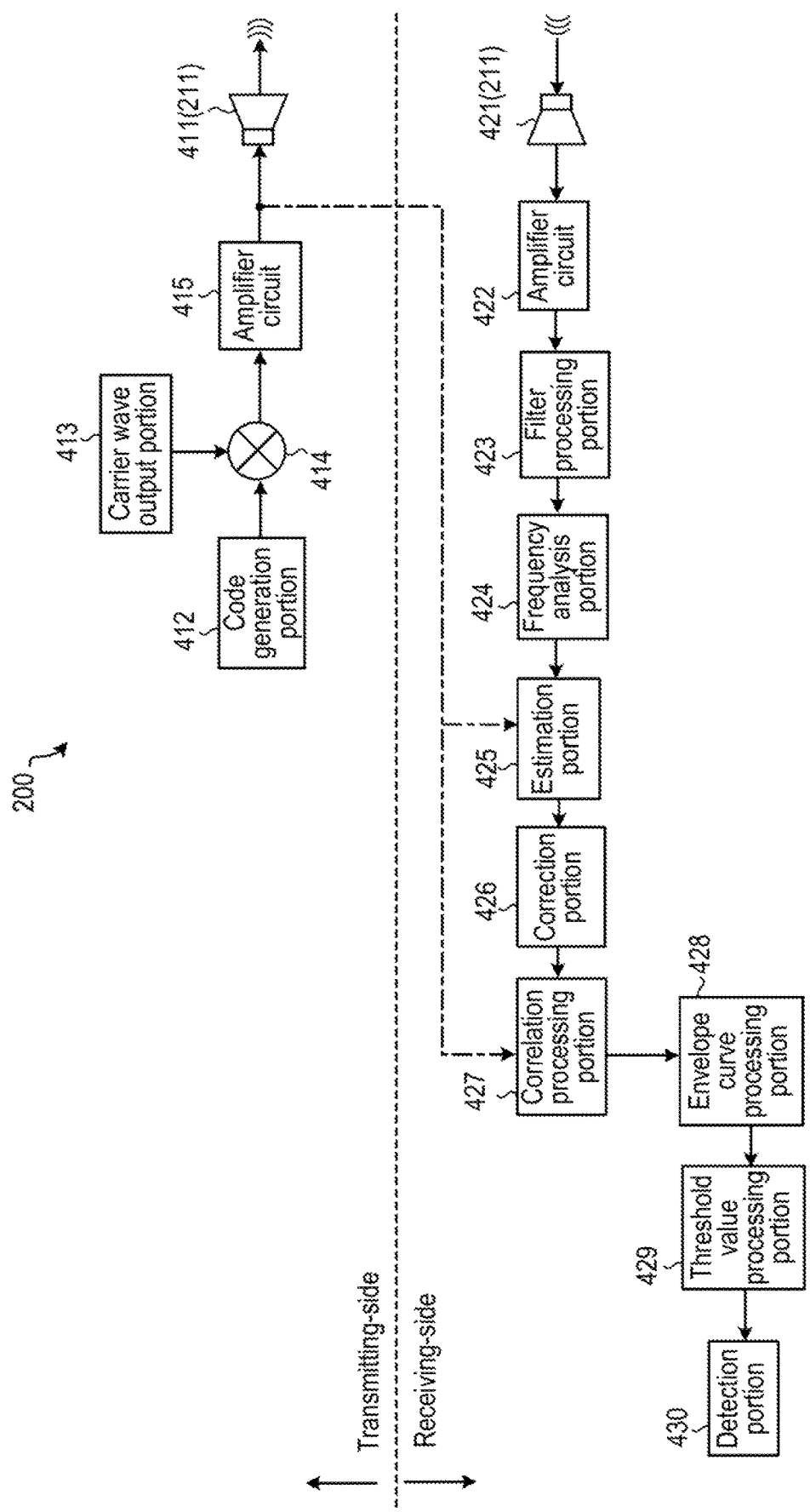
FIG. 4 is a schematic block diagram illustrating a detailed configuration of the distance detection apparatus according to the embodiment.

FIG. 4 is a schematic example block diagram illustrating a detailed configuration of the distance detection apparatus 200 according to the embodiment. In the example illustrated in FIG. 4, the configuration of the transmitting-side and the configuration of the receiving-side are separated from each other, however, the manner illustrated in FIG. 4 is intended to be for convenience of the explanation. As described above, in the embodiment, both of the transmission of the transmission wave and the reception of the reception wave are realized by the (single) transmitting and receiving portion 210 including the (single) vibrator 211. However, as described above, the technique of the embodiment is applicable also to the configuration in which the configuration of the transmitting-side and the configuration of the receiving-side are separated from each other.

As illustrated in FIG. 4, the distance detection apparatus 200 includes a wave transmitter 411, a code generation portion 412, a carrier wave output portion 413, a multiplier 414 and an amplifier circuit 415, as the configuration of the transmitting-side. The wave transmitter 411 is an example of "a transmitting portion".

The distance detection apparatus 200 includes a wave receiver 421, an amplifier circuit 422, a filter processing portion 423, a frequency analysis portion 424, an estimation portion 425, a correction portion 426, a correlation processing portion 427, an envelope curve processing portion 428, a threshold value processing portion 429 and a detection portion 430, as the configuration of the receiving-side. The wave receiver 421 is an example of "a receiving portion".

In the embodiment, at least part of the configuration illustrated in FIG. 4 may be realized by an exclusive hardware (an analog circuit) and the remaining part may be realized as a result of cooperation of hardware and software with each other, more specifically, as a result that the processor 223 of the distance detection apparatus 200 reads out the computer program from the storage apparatus 222 and performs the computer program. In the embodiment, each of the configurations illustrated in FIG. 4 may operate under control of the control portion 220 of the distance detection apparatus 200 or may operate under control of the ECU 100 in the outside.

First, the configuration of the transmitting-side will be described briefly.

The wave transmitter 411 is configured of the vibrator 211, and transmits the transmission wave corresponding to a transmission signal outputted from the amplifier circuit 415 (that is, an amplified transmission signal), via the vibrator 211.

Figures 5, 6:
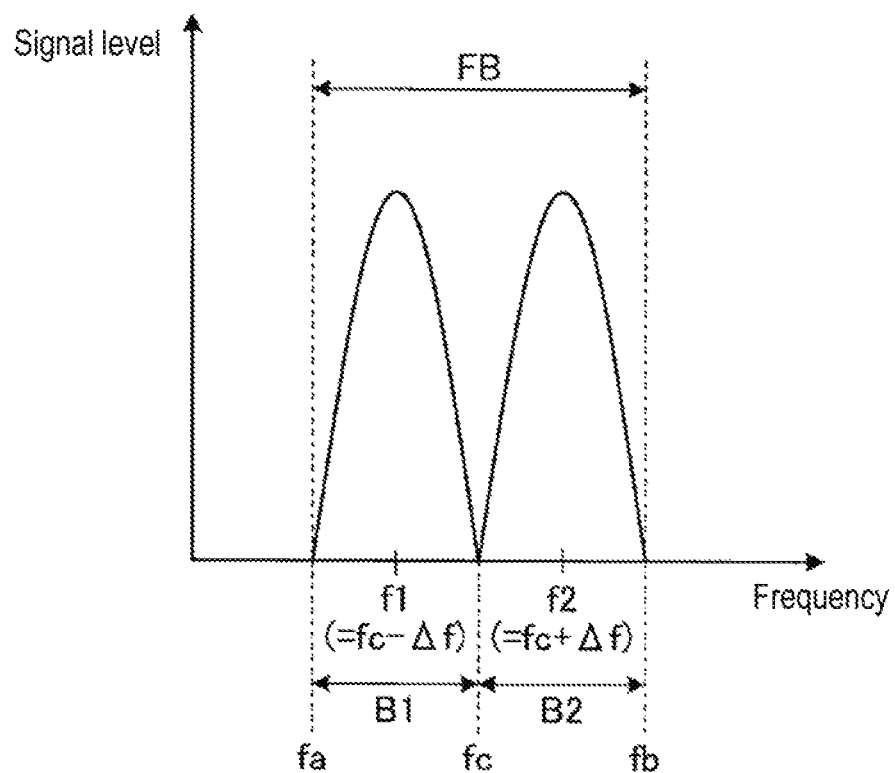
FIG. 5 is a schematic diagram illustrating an example of a frequency of a transmission wave according to the embodiment.
FIG. 6 is a schematic diagram illustrating an example of a code given to the transmission wave of the embodiment.

Here, in the embodiment, the wave transmitter 411 transmits the transmission wave with the use of two frequencies in two bands formed by virtually or imaginarily dividing a predetermined frequency band as illustrated in FIG. 5.

FIG. 5 is a schematic example diagram illustrating an example of a frequency of the transmission wave according to the embodiment. In the example of FIG. 5, the horizontal axis indicates a frequency and the vertical axis indicates a signal level (for example, PSD, that is, power spectral density).

As illustrated in FIG. 5, in the embodiment, the transmission wave is transmitted with the use of two bands B1 and B2 which are formed by virtually dividing a predetermined frequency band FB into two in such a manner that the two bands B1 and B2 do not overlap with each other. In the embodiment, the transmission wave is transmitted as temporally continuous plural wave motions including a combination of a wave motion of a center frequency f1 of the band B1 and a wave motion of a center frequency f2 of the band B2, which will be described in detail below.

In the example illustrated in FIG. 5, the center frequency f1 of the band B1 corresponds to the result obtained by subtracting a predetermined frequency $\Delta f$ from a center frequency fc of the predetermined frequency band FB. The center frequency f2 of the band B2 corresponds to the result obtained by adding the predetermined frequency $\Delta f$ to the center frequency fc of the predetermined frequency band FB.

In the example illustrated in FIG. 5, the predetermined frequency band FB is set in accordance with specifications of the vibrator 211, for example. Accordingly, a lower limit frequency fa and an upper limit frequency fb of the predetermined frequency band FB correspond respectively to the maximum frequency and the minimum frequency that the vibrator 211 can transmit, that is, the maximum frequency and the minimum frequency that the ability of the vibrator 211 allows the vibrator 211 to transmit.

In the embodiment, on the basis of the above-described frequency band division, the wave transmitter 411 encodes the transmission wave by frequency modulation in which the center frequency f1 of the band B1 and the center frequency f2 of the band B2 are used, and transmits the encoded transmission wave.

For example, as indicated by the example illustrated in FIG. 6, the wave transmitter 411 associates the wave motion (which will be hereinafter referred to as a first wave motion W1) of the center frequency f1 of the band B1 with information and associates the wave motion (which will be hereinafter referred to as a second wave motion W2) of the center frequency f2 of the band B2 with other information wherein the information associated with the first wave motion W1 and the information associated with the second wave motion W2 differ from each other, each information being formed of a code including a bit of 0 or 1, for example. By configuring or forming a temporally continuous combination of the first wave motion W1 and the second wave motion W2 as a group of transmission waves, the wave transmitter 411 transmits the transmission wave to which identification information including a predetermined code length has been given.

FIG. 6 is a schematic example diagram illustrating an example of the code given to the transmission wave according to the embodiment. In the example illustrated in FIG. 6, the wave transmitter 411 associates the first wave motion W1 with a code of a bit of 1 (one) and associates the second wave motion W2 with a code of a bit of 0 (zero), and transmits the transmission wave as the group of transmission waves including two first wave motions W1, W1, one second wave motion W2 and another first wave motion W1 which are combined with one another in the temporally continuous or successive manner in the above-stated order. Accordingly, in the example illustrated in FIG. 6, the transmission wave, to which a code of a bit sequence of 1101 that is called Barker code has been given as the identification information, is transmitted.

In FIG. 4, the code generation portion 412 generates a signal corresponding to the above-described identification information that is to be given to the transmission wave, that is, the code generation portion 412 generates a pulse signal corresponding to the code of the bit sequence formed of the continuous series of bits of 1 or 0.

The carrier wave output portion 413 outputs a carrier wave serving as a signal to which the identification information is given. For example, as the carrier wave, the carrier wave output portion 413 outputs a sine wave of a predetermined frequency.

The multiplier 414 performs modulation of the carrier wave such that the identification information is given, by multiplying output from the code generation portion 412 and output from the carrier wave output portion 413 by each other. That is, the multiplier 414 outputs the temporally continuous combination of the first wave motion W1 and the second wave motion W2 corresponding to the identification information, as the modulated carrier wave to which the identification information has been given. Then, the multiplier 414 outputs the modulated carrier wave to which the identification information has been given, to the amplifier circuit 415, as the transmission signal serving as a basis of the transmission wave.

The amplifier circuit 415 amplifies the transmission signal outputted from the multiplier 414 and outputs the amplified transmission signal to the wave transmitter 411.

Next, the configuration of the receiving-side will be described briefly.

The wave receiver 421 is configured of the above-described vibrator 211. With the use of the vibrator 211, the wave receiver 421 receives, as the reception wave, the transmission wave reflected by the object.

The amplifier circuit 422 amplifies a reception signal serving as a signal corresponding to the reception wave that the wave receiver 421 received.

The filter processing portion 423 performs filter processing on the reception signal that was amplified by the amplifier circuit 422 and suppresses noises.

The frequency analysis portion 424 performs a frequency analysis (a spectral analysis) based on, for example, FFT (fast Fourier transform), on the reception signal that underwent the filter processing performed by the filter processing portion 423. Then, the frequency analysis portion 424 detects a frequency at which the signal level of the reception wave reaches a peak that is equal to or greater than a threshold value, for example.

As described above, in the embodiment, the identification information is added or given to the transmission wave on the basis of the frequency modulation, and the identification information is not normally lost due to the reflection. Accordingly, by determining or judging similarity in the identification information of the transmission wave and the reception wave to each other, the reception wave serving as the transmission wave that was reflected by the detection target object and then returned can be detected with a high accuracy.

In this regard, for example, in a case where the transmission wave returns as the reception wave under conditions that the frequency transition due to the Doppler shift does not occur, the wave receiver 421 receives the reception wave formed of wave motions of which the number and of which frequencies are same as the wave motions forming the transmission wave, and thus the same identification information is obtained from the reception wave, the identification information which is same as the identification information of the transmission wave. In this case, therefore, the reception wave is appropriate as a target of the similarity judgement of the identification information between the reception wave and the transmission wave without performing any correction.

However, as will be described in detail later, in a case where the transmission wave returns as the reception wave under conditions that the frequency transition due to the Doppler shift occurs, the frequencies (and the number) of the wave motions forming the reception wave received by the wave receiver 421 and the frequencies (and the number) of the wave motions forming the transmission wave do not coincide with or match each other because of an influence of the frequency transition. Thus, the identification information same as the identification information of the transmission wave cannot be obtained from the reception wave if a correction for cancelling the influence of the frequency transition is not performed. Consequently, in this case, an amount of the frequency transition caused by the Doppler shift needs to be estimated in order to decide an appropriate amount of the correction to be performed on the reception wave.

In the embodiment, in accordance with a result of the frequency analysis performed by the frequency analysis portion 424 and transmit frequency information indicating a relation between the frequencies of the wave motions forming the transmission wave, the estimation portion 425 identifies a correspondence relationship between the frequencies of the wave motions forming the reception wave and the frequencies of the wave motions forming the transmission wave, and estimates the amount of the frequency transition due to the Doppler shift on the basis of a difference between the frequencies which correspond to each other, in a method which will be described later. For example, the transmit frequency information corresponds to information including a width of interval between the frequencies (for example, the center frequencies f1 and f2 in the example illustrated in FIG. 5) at which signal levels of the transmission wave reach peaks and/or the center frequency fc of the predetermined frequency band FB in which the vibrator 211 is capable of transmitting and receiving the waves.

For example, in a case where the transmission wave returns as the reception wave under conditions that the Doppler shift does not occur, as described above, the wave receiver 421 receives the reception wave formed of the wave motions of which the number and of which the frequencies are same as the wave motions forming the transmission wave. In such a case, the estimation portion 425 obtains the number and the frequencies of the wave motions forming the reception wave in accordance with the result of the frequency analysis by the frequency analysis portion 424. The estimation portion 425 also obtains the number and the frequencies of the wave motions forming the transmission wave in accordance with the transmit frequency information. Then, the estimation portion 425 estimates that the amount of the frequency transition due to the Doppler shift is zero in accordance with coincidence or agreement in the frequencies of the wave motions forming the reception wave and the wave motions forming the transmission wave with each other.

Figure 7:
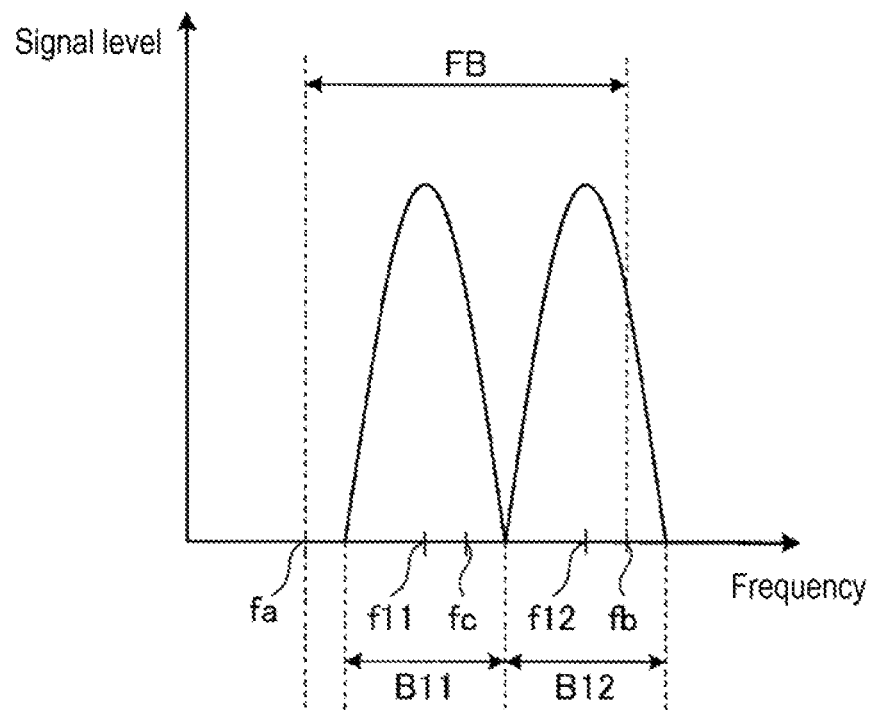
FIG. 7 is a schematic diagram illustrating an example of a frequency of a reception wave according to the embodiment.

Even in a case where the frequency transition occurs due to the Doppler shift, if the amount of the frequency transition is relatively small, the wave receiver 421 receives the reception wave formed of the wave motions whose number is same as the number of the wave motions forming the transmission wave although the frequencies of the wave motions of the reception wave are shifted relative to the frequencies of the wave motions of the transmission wave, as illustrated in FIG. 7.

FIG. 7 is a schematic example diagram illustrating an example of the frequencies of the reception wave according to the embodiment. More specifically, the example illustrated in FIG. 7 corresponds to the result of the frequency analysis performed by the frequency analysis portion 424 on the reception wave received by the wave receiver 421 as a result that the transmission wave formed of the wave motions of the two frequencies within the ranges of the bands B1 and B2 illustrated in FIG. 5 are reflected by the object, in a case where the amount of the frequency transition due to the Doppler shift is relative small. In the example illustrated in FIG. 7, the horizontal axis indicates a frequency and the vertical axis indicates a signal level (for example, PSD, that is, power spectral density).

In the example illustrated in FIG. 7, due to the Doppler shift, a relatively small transition occurs towards a high-range-side of the frequency. A band B11 (a center frequency f11) indicated in FIG. 7 corresponds to a result of the transition of the band B1 (the center frequency f1) indicated in FIG. 5 towards the high-range-side, and a band B12 (a center frequency f12) indicated in FIG. 7 corresponds to a result of the transition of the band B2 (the center frequency f2) indicated in FIG. 5 towards the high-range-side.

As illustrated in FIG. 7, in a case where the amount of the frequency transition caused by the Doppler shift is relatively small, the frequencies of both the two (which is same as the number of the wave motions forming the transmission wave) wave motions exist within the range of the predetermined frequency band FB corresponding to the specifications of the vibrator 211. In such a case, it is apparent that a correspondence relationship exists between the frequencies of the respective wave motions forming the transmission wave and the frequencies of the respective wave motions forming the reception wave, wherein the frequencies at the higher-range-side correspond to each other and the other frequencies at the lower-range-side correspond to each other in the correspondence relationship. Accordingly, the estimation portion 425 identifies the correspondence relationship of the frequencies between the wave motions forming the reception wave and the wave motions forming the transmission wave as described above. Then, the estimation portion 425 estimates a difference between the frequencies that correspond to each other (that is, a difference between the frequencies at the lower-range-side or a difference between the frequencies at the higher-range-side), as the amount of the frequency transition.

As described above, in the embodiment, in a case where the number of the frequencies of the wave motions forming the reception wave and the number of frequencies of the wave motions forming the transmission wave are equal to each other, the estimation portion 425 identifies the correspondence relationship between the frequencies of the former and the frequencies of the latter on the basis of coincidence of the frequencies of the former and the frequencies of the latter with each other or on the basis of coincidence of a magnitude relationship (a high and low relationship) between the frequencies of the former and a magnitude relationship (a high and low relationship) between the frequencies of the latter with each other. Then, on the basis of the identified correspondence relationship, the estimation portion 425 estimates the difference between the frequencies which correspond to each other out of the frequencies of the former and the frequencies of the latter, wherein the estimation portion 425 estimates the difference as the amount of the frequency transition due to the Doppler shift.

Figure 8:
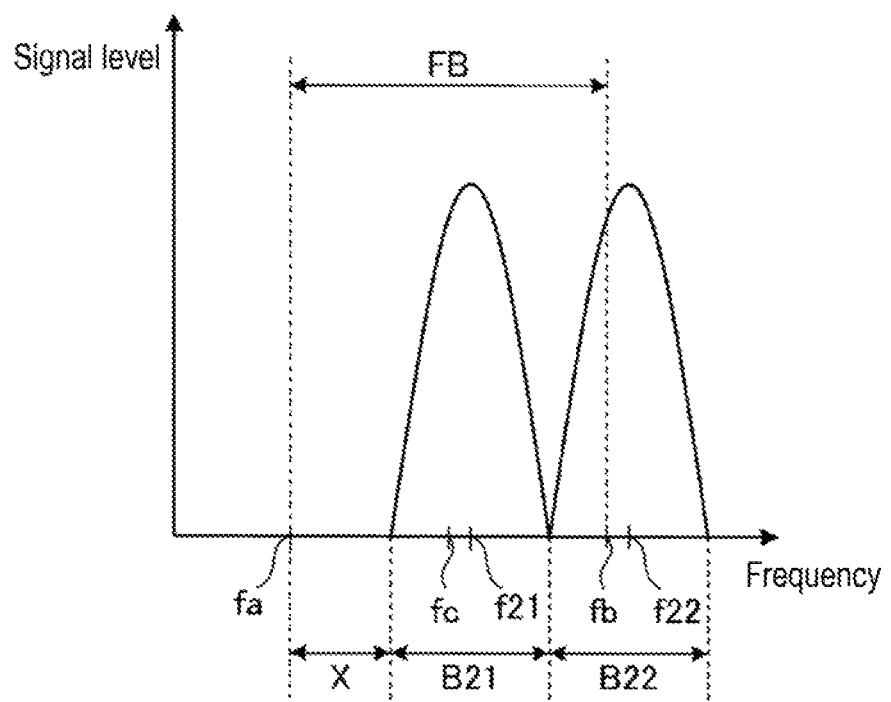
FIG. 8 is a schematic diagram illustrating another example of the frequency of the reception wave according to the embodiment.

On the other hand, in a case where a relative speed of the vehicle 1 and the detection target object to each other becomes larger than the state illustrated in FIG. 7, and thus the amount of the frequency transition due to the Doppler shift becomes relatively large, the wave receiver 421 receives the reception wave formed of the wave motions of which the frequencies are shifted relative to the wave motions forming the transmission wave and of which the number is smaller than the number of the wave motions forming the transmission wave, as illustrated in FIG. 8.

FIG. 8 is a schematic example diagram illustrating another example of the frequency of the reception wave according to the embodiment. More specifically, the example illustrated in FIG. 8 corresponds to the result of the frequency analysis performed by the frequency analysis portion 424 on the reception wave received by the wave receiver 421 as a result that the transmission wave formed of the wave motions of the two frequencies within the ranges of the bands B1 and B2 illustrated in FIG. 5 are reflected by the object, in a case where the amount of the frequency transition due to the Doppler shift is relatively large. In the example illustrated in FIG. 8, the horizontal axis indicates a frequency and the vertical axis indicates a signal level (for example, PSD, that is, power spectral density).

In the example illustrated in FIG. 8, a relatively large transition of the frequency towards the high-range-side occurs due to the Doppler shift. A band B21 (a center frequency f21) illustrated in FIG. 8 corresponds to a result of the transition of the band B1 (the center frequency f1) illustrated in FIG. 5 towards to the high-range-side, and a band B22 (a center frequency f22) illustrated in FIG. 8 corresponds to a result of the transition of the band B2 (the center frequency f2) illustrated in FIG. 5 towards to the high-range-side.

In the embodiment, the wave receiver 421 can only receive a wave motion of which a frequency lies within the range of the predetermined frequency band FB set depending on the specifications of the vibrator 211. In contrast, in the example illustrated in FIG. 8, the center frequency f21 of the band B21 exists between the lower limit frequency fa and the upper limit frequency fb of the predetermined frequency band FB, but the center frequency f22 of the band B22 is shifted or deviated towards the high-range-side relative to the upper limit frequency fb of the predetermined frequency band FB. Accordingly, in the example illustrated in FIG. 8, the wave motion of the frequency that is within the range of the band B21 is received in a normal manner, but the wave motion of the frequency that is within the range of the band B22 is not received in the normal manner. Consequently, in the example illustrated in FIG. 8, it seems difficult to identify the correspondence relationship between the frequency of the wave motion of the one frequency received in the normal manner and the frequencies of the wave motions of the two frequencies forming or configuring the transmission wave.

However, a relation between the band B21 and the band B22 which are illustrated in FIG. 8 (an interval between the center frequencies f21 and f22, for example) and a relation between the band B1 and the band B2 which are illustrated in FIG. 5 (an interval between the center frequencies f1 and f2, for example) are supposed to coincide with each other regardless of whether or not the Doppler shift occurs. On the basis thereof, even in such a case indicated in FIG. 8 where the transmission wave is formed of the wave motions of the two frequencies but only the reception wave formed of the wave motion of one frequency is received in a normal manner, it can be determined which of the frequencies of the two wave motions forming the transmission wave the frequency of the one wave motion forming the reception wave corresponds to.

More specifically, in the example illustrated in FIG. 8, when assuming that the frequency that lies within the range of the band B21 corresponds to the frequency that lies within the range of the band B2 illustrated in FIG. 5, a band indicating the signal level similar to the band B1 illustrated in FIG. 5 should exist within the range of the predetermined frequency band FB to be at the lower-range-side than the band B21. In the example illustrated in FIG. 8, however, the lower-range-side relative to the band B21 in the range of the predetermined frequency band FB is a blank band X. Consequently, in the example illustrated in FIG. 8, the frequency that lies within the range of the band B21 can be identified to correspond to the frequency that lies within the range of the band B1 illustrated in FIG. 5.

More specifically, in a case where the center frequency f21 of the band B21 is detected within the range of the predetermined frequency band FB as the result of the frequency analysis performed by the frequency analysis portion 424, the estimation portion 425 identifies a magnitude relationship between an interval from the center frequency f21 to the upper limit frequency fb and another interval from the center frequency f1 to the center frequency f2 that are frequencies of the two wave motions forming the transmission wave. Said another interval between the center frequency f1 and the center frequency f2 corresponds to $2 \times \Delta f$ (refer to FIG. 5). And the estimation portion 425 identifies a magnitude relationship between an interval from the center frequency f21 to the lower limit frequency fa and said another interval $2 \times \Delta f$. Thus, the estimation portion 425 identifies a direction of the transition of the frequencies due to the Doppler shift, that is, a position of the blank band X.

For example, in the example illustrated in FIG. 8, the interval between the center frequency f21 and the upper limit frequency fb is smaller than $2 \times \Delta f$, and the interval between the center frequency f21 and the lower limit frequency fa is larger than the $2 \times \Delta f$. In such a case, the estimation portion 425 identifies that the wave motion that had been transmitted by using the band B2 such that the signal level reaches the peak at the center frequency f2 (refer to FIG. 5) came to include a frequency higher than the upper limit frequency fb of the predetermined frequency band FB as a result of the frequency transition due to the Doppler shift, and consequently corresponds to the wave motion which is actually undetectable as the wave motion forming the reception wave. That is, in such a case, the estimation portion 425 identifies that the blank band X exists between the center frequency f21 of the band B21 that is actually detected in the range of the predetermined frequency band FB, and the lower limit frequency fa.

On the other hand, assuming if an interval between one frequency which is actually detected in the range of the predetermined frequency band FB as the result of the frequency analysis performed by the frequency analysis portion 424 and the upper limit frequency fb is larger than the $2 \times \Delta f$, and an interval between the above-described one frequency and the lower limit frequency fa is smaller than the $2 \times \Delta f$, the estimation portion 425 identifies that the wave motion which had been transmitted by using the band B1 such that the signal level reaches the peak at the center frequency f1 (refer to FIG. 5) came to include a frequency lower than the lower limit frequency fa of the predetermined frequency band FB as a result of the frequency transition due to the Doppler shift, and consequently corresponds the wave motion which is undetectable as the wave motion forming the reception wave. That is, in such a case, the estimation portion 425 identifies that the blank band exists between the one frequency actually detected in the range of the predetermined frequency band FB and the upper limit frequency fb.

As described above, in the embodiment, in a case where the number of the frequencies of the wave motions forming the reception wave and the number of the frequencies of the wave motions forming the transmission wave differ from each other, the estimation portion 425 identifies the correspondence relationship between the frequencies of the wave motions forming the reception wave and the frequencies of the wave motions forming the transmission wave in accordance with the blank band existing at least one of the lower-range-side and the higher-range-side than the frequency of the wave motion actually detected as the wave motion forming the reception wave within the range of the predetermined frequency band FB. Then, on the basis of the identified correspondence relationship, the estimation portion 425 estimates the difference between the frequencies that correspond to each other out of the frequencies of the wave motions forming the reception wave and the frequencies of the wave motions forming the transmission wave. The estimation portion 425 estimates the difference as the amount of the frequency transition due to the Doppler shift.

A method of identifying (the position of) the blank band is not limited to the method described above. For example, as other method of identifying the blank band, the blank band may be identified on the basis of to which of the lower limit frequency fa and the upper limit frequency fb one frequency actually detected in the range of the predetermined frequency band FB is closer.

The identification of the blank band is also effectively applicable to the example illustrated in FIG. 7 where the degree of the Doppler shift is smaller than the example illustrated in FIG. 8. By identifying the blank band in the example illustrated in FIG. 7, and by comparing sizes of the respective blank bands existing at both the low-range-side and the high-range-side relative to the two frequencies actually detected as the frequencies of the wave motions forming the reception wave with each other, the direction of the frequency transition can be identified and the correspondence relationship between the frequencies of the wave motions forming the reception wave and the frequencies of the wave motions forming the transmission wave can be identified.

In FIG. 4, on the basis of the estimation result made by the estimation portion 425, the correction portion 426 corrects the frequency of the wave motion detected as the wave motion forming the reception wave (the reception signal) so that consistency is made with the frequency of the transmission wave (the transmission signal).

On the basis of, for example, the transmission signal obtained from the configuration of the transmitting-side and the reception signal after the correction is made by the correction portion 426, the correlation processing portion 427 obtains a correlation value corresponding to a degree of similarity of the identification information of the transmission wave and the identification information of the reception wave to each other. The correlation value is calculated on the basis of a known correlation function, for example.

The envelope curve processing portion 428 obtains an envelope curve of a wave form of the signal corresponding to the correlation value obtained by the correlation processing portion 427.

The threshold value processing portion 429 compares a value of the envelope curve obtained by the envelope curve processing portion 428 and a predetermined threshold value with each other, and determines whether or not the identification information of the transmission wave and the identification information of the reception wave are similar to each other at a level equal to or greater than a predetermined level on the basis of the comparison result.

On the basis of a processing result by the threshold value processing portion 429, the detection portion 430 identifies a timing at which the degree of similarity of the identification informations of the transmission wave and the reception wave are at the level equal to or greater than the predetermined level, that is, a timing (for example, the timing t4 indicated in FIG. 2) at which the signal level of the reception wave serving as the transmission wave returned due to the reflection reaches the peak exceeding the threshold value, and the detection portion 430 detects the distance to the object by the TOF method.

A necessity of the detection of the distance to the object is higher in a situation in which the vehicle 1 is approaching or coming closer to the object than a situation in which the vehicle 1 is moving away from the object. Generally, in the situation in which the vehicle 1 is approaching the object, the temporally continuous plural wave motions that form the transmission wave return in a state where the frequencies of the respective wave motions have been shifted or transitioned towards the high-range-side in response to the reflection as the result of the frequency transition due to the Doppler shift. Accordingly, in the situation in which the vehicle 1 is approaching the object, out of the plural wave motions forming the transmission wave, the wave motion of which the frequency is at the high-range-side is not easily detected as the wave motion that is in the range of the predetermined frequency band FB when returning due to the reflection. That is, in the situation in which the vehicle 1 is approaching the object, if the plural wave motions forming the transmission wave include more wave motions of which the frequencies are in the high-range-side than the wave motions of the frequencies are in the low-range-side, the number of the wave motions detected as the wave motions forming the reception wave is likely to be small. Consequently, accuracy in the determination of the similarity of the identification information of the transmission wave and the identification information of the reception wave to each other is likely to decrease.

Accordingly, in the embodiment, the temporally (in the time-based manner) continuous plural wave motions forming the transmission wave are effectively configured so as to include more wave motions of the frequencies at the low-range-side than the wave motions of the frequencies at the high-range-side, such that the more of the wave motions forming the reception wave can be detected even in the situation where the vehicle 1 approaches the object. That is, in the embodiment, as illustrated in the example of FIG. 6, it is effective that the transmission wave is formed or configured so as to include more of the first wave motions W1 of the frequency at the low-range-side more than the second wave motion W2 of the frequency at the high-rangeside, that is, it is effective that the identification information is set such that more codes of the bit of 1 are included than the code of the bit of 0.

A flow of processing performed in the embodiment will be described hereunder.

Figure 9:
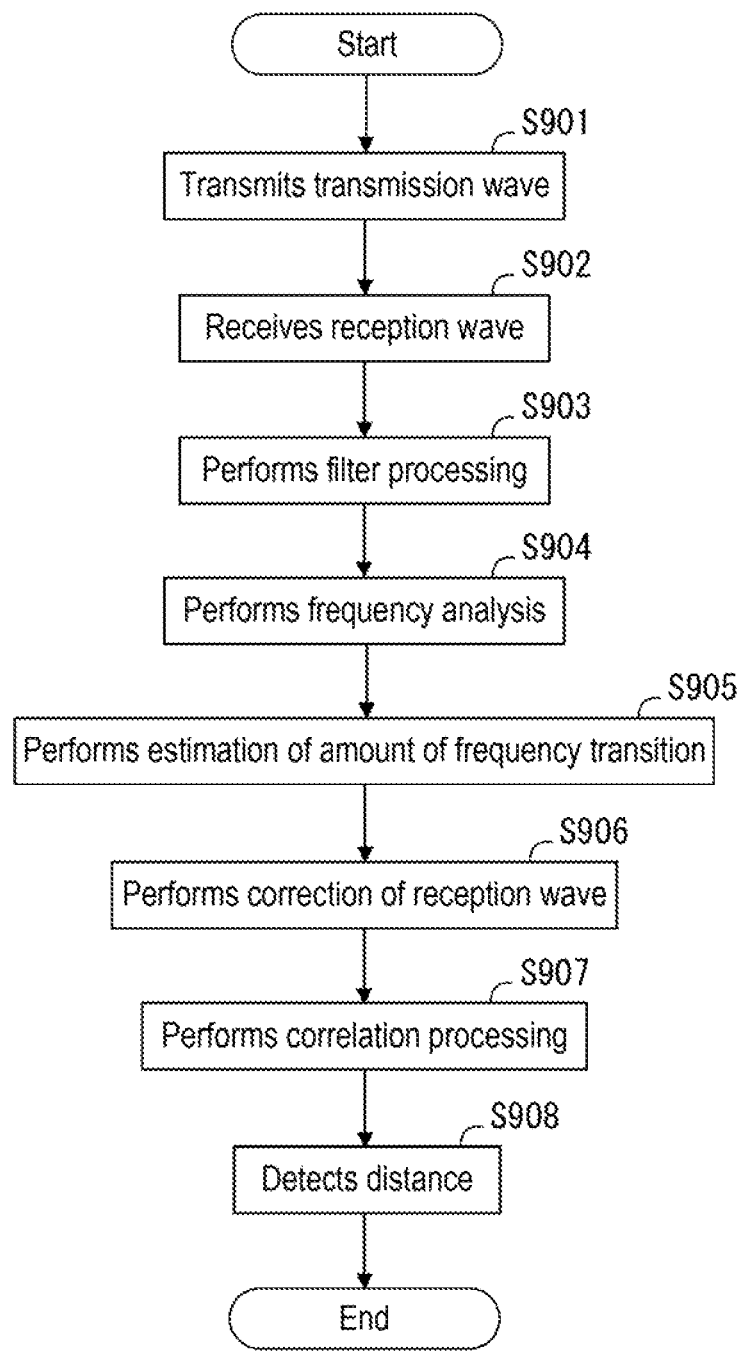
FIG. 9 is a schematic flowchart indicating a series of processing performed by the distance detection apparatus according to the embodiment to detect information related to the object.

FIG. 9 is a schematic example flowchart indicating a series of processing performed by the distance detection apparatus 200 according to the embodiment to detect the information related to the object.

As illustrated in FIG. 9, in the embodiment, first, at S901, the wave transmitter 411 transmits the transmission wave corresponding to the transmission signal generated by the code generation portion 412, the carrier wave output portion 413, the multiplier 414 and the amplifier circuit 415, towards the outside of the vehicle 1. More specifically, on the basis of the frequency modulation using the two frequencies of the two bands configured via for example the above-described band division, the wave transmitter 411 transmits, as the transmission wave encoded to include the identification information of the predetermined code length, the temporally continuous plural wave motions including the combination of the first wave motion W1 and the second wave motion W2.

At S902, the wave receiver 421 receives the reception wave serving as the transmission wave that was reflected by the object existing outside the vehicle 1 and consequently returned towards the vehicle 1. The reception signal corresponding to the reception wave is amplified by the amplifier circuit 422, and thereafter is outputted to the filter processing portion 423.

At S903, the filter processing portion 423 performs the filter processing on the amplified reception signal amplified by the amplifier circuit 422 and thereby reducing or suppressing the noises.

At S904, the frequency analysis portion 424 executes the frequency analysis (the spectral analysis) based on, for example, the FFT (the fast Fourier transform), on the reception signal that underwent the filter processing performed by the filter processing portion 423. Thus, the number and the frequencies of the wave motions detected as the wave motions forming the reception wave are identified.

At S905, on the basis of the frequencies of the wave motions forming the reception wave which are obtained as the result of the frequency analysis performed at S904 and on the basis of the transmit frequency information indicating the relation between the plural (two in the embodiment) frequencies forming the transmission wave, the estimation portion 425 identifies the correspondence relationship between the frequencies of the wave motions forming the reception wave and the frequencies of the wave motions forming the transmission wave, and estimates the difference between the frequencies which correspond to each other as the amount of the frequency transition due to the Doppler shift. The method of identifying the correspondence relationship between the frequency or frequencies of the wave motion or wave motions forming the reception wave and the frequencies of the wave motions forming the transmission wave was described previously in detail, therefore the explanation of the method will be omitted here.

At S906, on the basis of the determination or estimation result by the estimation portion 425, the correction portion 426 corrects the frequency of the wave motion detected as the wave motion forming the reception wave (the reception signal) such that the consistency is made between the frequencies of the reception wave (the reception signal) and the transmission wave (the transmission signal).

At S907, for example, on the basis of the transmission signal obtained from the configuration of the transmitting-side and the reception signal on which the correction was performed by the correction portion 426, the correlation processing portion 427 executes the correlation processing of obtaining the correlation value corresponding to the degree of similarly of the respective identification informations of the transmission wave and the reception wave.

At S908, on the basis of the result of the correlation processing at S907, the detection portion 430 detects the distance to the object that causes the reflection of the transmission wave.

More specifically, at S908, first, the detection portion 430 obtains, from the threshold value processing portion 429, the result of the comparison between the correlation value on which the processing was performed by the envelope curve processing portion 428 and the threshold value. Then, on the basis of the information obtained from the threshold value processing portion 429, the detection portion 430 identifies the timing at which the transmission wave was transmitted and the timing at which the reception wave was received, the reception wave being the reception wave having identification information that is similar to (that coincides with) the transmission wave at a level equal to or greater than the predetermined level and which serves as the basis of the corrected reception wave. Then, on the basis of the difference between the timings, the detection portion 430 detects the distance to the object that reflected the transmission signal by the TOF method. Then, the process ends.

As described above, the distance detection apparatus 200 according to the embodiment includes the wave transmitter 411, the wave receiver 421, the estimation portion 425, the correction portion 426 and the detection portion 430. The wave transmitter 411 transmits the transmission wave based on the two frequencies set within the range of the predetermined frequency band FB. The wave receiver 421 receives the reception wave based on the transmission wave which returned in response to the reflection at the object. In accordance with the result of the frequency analysis on the reception wave and the transmit frequency information indicating the relation of the two frequencies of the transmission wave to each other, the estimation portion 425 estimates the amount of the frequency transition occurred between the transmission wave and the reception wave due to the Doppler shift. In accordance with the estimation result of the estimation portion 425, the correction portion 426 corrects the reception wave so that the consistency of the frequencies is established between the reception wave and the transmission wave. The detection portion 430 detects, as the information regarding the object, the distance to the object on the basis of the relation of the transmission wave and the corrected reception wave corrected by the correction portion 426 with each other.

According to the above-described configuration, even in a case where the frequency transition is caused by the Doppler shift, the reception wave is corrected so that the influence by the frequency transition is cancelled out, and thus the reception wave serving as the transmission wave that was reflected by the detection target object and returned is accurately detected, and thus the distance to the object is accurately detected as the information related to the object.

According to the embodiment, the wave transmitter 411 transmits, as the transmission wave, the temporally continuous plural wave motions including the combination of the at least two wave motions of which the signal levels reach the respective peaks at the at least two frequencies. Then, the estimation portion 425 identifies the correspondence relationship between the one or more frequencies at which the signal level of the reception signal reaches the peak and the at least two frequencies of the transmission wave on the basis of the result of the frequency analysis performed by the frequency analysis portion 424 and the transmit frequency information, and estimates the amount of the frequency transition on the basis of the difference between the frequencies which correspond to each other. According to the above-described configuration, the amount of the frequency transition may be estimated easily in accordance with the correspondence relationship between the frequencies of the reception wave and the frequencies of the transmission wave, the correspondence relationship which is identified on the basis of the result of the frequency analysis and the transmit frequency information.

According to the embodiment, in a case where the number of the one or more frequencies of the reception wave and the number of the at least two frequencies of the transmission wave are equal to each other, the estimation portion 425 identifies the correspondence relationship between the one or more frequencies of the reception signal and the at least two frequencies of the transmission wave, on the basis of the coincidence of the one or more frequencies of the reception wave and the at least two frequencies of the transmission wave with other or on the basis of the coincidence of the magnitude relationship between the one or more frequencies of the reception wave and the magnitude relationship between the at least two frequencies of the transmission wave with each other. According to the above-described configuration, in a case where the amount of the frequency transition caused by the Doppler shift is small to such an extent that the number of the one or more frequencies of the reception wave and the number of the at least two frequencies of the transmission wave agree with each other, the correspondence relationship of the frequencies may be easily identified by considering the coincidence of the frequencies of the reception wave and the transmission wave with each other or the coincidence of the magnitude relationships of the frequencies of the reception wave and the transmission wave to each other.

According to the embodiment, in a case where the number of the one or more frequencies of the reception wave and the number of the at least two frequencies of the transmission wave differ from each other, the estimation portion 425 identifies the correspondence relationship between the one or more frequencies of the reception wave and the at least two frequencies of the transmission wave on the basis of the blank band existing at at least one of the low-range-side and the high-range-side relative to the one or more frequencies of the reception wave, within the range of the predetermined frequency band FB. According to the above-described configuration, even in a case where the amount of the frequency transition caused by the Doppler shift is large to such an extent that the number of the one or more frequencies of the reception wave and the number of the at least two frequencies of the transmission wave disagree with each other, the correspondence relationship between the frequencies may be easily identified by considering the blank band.

According to the embodiment, the at least two wave motions are respectively associated with the informations which differ from each other such that the plural temporally continuous wave motions are encoded to include the predetermined identification information, and the wave transmitter 411 transmits, as the transmission wave, the encoded plural temporally continuous wave motions. According to the above-described configuration, it is easily identified whether or not the reception wave corresponds to the transmission wave reflected by the object serving as the target of the detection and then returned, with the use of the identification information.

According to the embodiment, the distance detection apparatus 200 further includes the correlation processing portion 427 that obtains the correlation value corresponding to the degree of similarity of the transmission wave and the corrected reception wave to each other. On the basis of the comparison result of the correlation value and the threshold value with each other, the detection portion 430 detects the distance to the object in a case where the degree of similarity of the transmission wave and the corrected reception wave to each other is determined to be at a level equal to or greater than the predetermined level, the distance to the object serving as the information related to the object. According to the above-described configuration, the reception wave may be accurately detected as the transmission wave that was reflected by the detection target object and then returned with the use of the correlation value. Thus, the distance to the object can be detected with accuracy.

According to the embodiment, the detection portion 430 detects, as the information related to the object O, the distance to the object O on the basis of the difference between the timing at which the transmission wave was transmitted and the timing at which the reception wave of which the degree of similarity relative to the transmission wave is determined to be at the level equal to or greater than the predetermined level and which serves as the basis of the corrected reception wave was received. According to the above-described configuration, the distance to the object may be detected easily.

According to the embodiment, the at least two frequencies of the transmission wave are respectively set within the ranges of the at least two bands formed by virtually dividing the predetermined frequency band FB, and the at least two bands do not overlap with each other. According to the above-described configuration, the at least two frequencies of the transmission wave may be set easily by the band division.

According to the embodiment, the wave transmitter 411 and the wave receiver 421 are configured integrally with each other as the transmitting and receiving portion 210 including the single vibrator 211 configured to transmit and receive the sound waves. The predetermined frequency band FB is set in accordance with the specifications of the vibrator 211. According to the above-described configuration, the configuration for receiving the reception wave and transmitting the transmission wave can be simplified and the predetermined frequency band FB may be set easily.

(Variations) In the above-described embodiment, the technique of the disclosure is applied to the configuration detecting the information related to the object via the transmission and reception of the ultrasonic wave, however, the disclosure is applicable also to a configuration detecting the information related to the object by transmitting and receiving a wave motion other than the ultrasonic wave, including a sound wave, a millimeter wave and/or an electromagnetic wave, for example.

In the above-described embodiment, the disclosed technique is described as an example to be applicable to the distance detection apparatus detecting the distance to the object, however, the technique of the disclosure is applicable also to the object detection apparatus detecting only whether or not the object exists, that is, the presence or absence of the object, which serves as the information related to the object.

In the above-described embodiment, the example configuration is described wherein the number of the bands configured via the band division is two and the wave motion of the frequency of each band is made associated with the information of 0 or 1. However, the number of the bands configured via the band division may be three or more than three. In this case, the wave motion of the frequency of each of the bands may be made associated with information which is other than the information of 0 or 1. Even in a case where the number of the bands configured by dividing the band is three or more than three, the method of identifying the correspondence relationship of the frequencies between the wave motions forming the transmission wave and the wave motions forming the reception wave is substantially same as the above-described embodiment, and therefore the detailed explanation will be omitted.

In the above-described embodiment, the whole of the predetermined frequency band in which the vibrator is allowed to transmit and receive the waves is virtually or imaginarily divided into the two bands. However, a subject for the band division may be a part of the predetermined frequency band in which the vibrator is allowed to transmit and receive the waves.

In the above-described embodiment, the example configuration is described wherein the giving of the identification information is realized on the basis only of the frequency modulation. However, the giving of the identification information may be realized by a combination of the frequency modulation and other modulation, including, for example, phase modulation and/or amplitude modulation.

The above-described embodiment and the variations that are disclosed here are presented as examples and are not provided to intend to limit the scope of the disclosure. The embodiment and the variations described above can be implemented in other various manners, and various omissions, substitutions and changes may be made without departing from the scope the disclosure. The embodiment and the variations described above are included in the scope and/or subject matter of the disclosure, and included in the disclosure described in the scope of claims and in a range of equivalents thereof.

According to the aforementioned embodiment, a distance detection apparatus 200, 201, 202, 203, 204 (i.e., an object detection apparatus) includes a wave transmitter 411 (i.e., a transmitting portion) configured to transmit a transmission wave based on at least two frequencies f1, f2 set within a range of a predetermined frequency band FB, a wave receiver 421 (i.e., a receiving portion) configured to receive a reception wave based on the transmission wave which returned in response to reflection at an object O, an estimation portion 425 configured to estimate an amount of frequency transition due to Doppler shift between the transmission wave and the reception wave on the basis of a result of a frequency analysis on the reception wave and transmit frequency information indicating a relation between the at least two frequencies f1, f2 of the transmission wave, a correction portion 426 configured to correct the reception wave to obtain consistency of frequencies with the transmission wave on the basis of an estimation result of the estimation portion 425, and a detection portion 430 configured to detect information related to the object O on the basis of a relation between the transmission wave and the corrected reception wave corrected by the correction portion 426.

According to the above-described configuration, even in a case where the frequency transition is caused by the Doppler shift, the reception wave is corrected so that an influence by the frequency transition is cancelled out, and thus the reception wave serving as the transmission wave that was reflected by the detection target object and returned is accurately detected, and thus the distance to the object O is accurately detected as the information related to the object.

According to the aforementioned embodiment, the wave transmitter 411 transmits, as the transmission wave, plural temporally continuous wave motions including a combination of at least two wave motions W1, W2 of which signal levels reach peaks at the at least two frequencies f1, f2, respectively, and on the basis of the result of the frequency analysis and the transmit frequency information, the estimation portion 425 identifies a correspondence relationship between one or more frequencies f11, f12, f21, f22 at which a signal level of the reception wave reaches a peak and the at least two frequencies f1, f2 of the transmission wave, and estimates the amount of the frequency transition on the basis of a difference between the frequencies which correspond to each other.

According to the above-described configuration, the amount of the frequency transition may be estimated easily in accordance with the correspondence relationship of the frequencies of the reception wave and the frequencies of the transmission wave to each other, the correspondence relationship which is identified on the basis of the result of the frequency analysis and the transmit frequency information.

According to the aforementioned embodiment, in a case where a number of the one or more frequencies f11, f12 of the reception wave and a number of the at least two frequencies f1, f2 of the transmission wave are equal to each other, the estimation portion 425 identifies the correspondence relationship between the one or more frequencies f11, f12 of the reception wave and the at least two frequencies f1, f2 of the transmission wave on the basis of coincidence of the one or more frequencies f11, f12 of the reception wave and the at least two frequencies f1, f2 of the transmission wave with each other or on the basis of coincidence of a magnitude relationship between the one or more frequencies f11, f12 of the reception wave and a magnitude relationship between the at least two frequencies f1, f2 of the transmission wave with each other.

According to the above-described configuration, in a case where the amount of the frequency transition caused by the Doppler shift is small to such an extent that the number of the one or more frequencies of the reception wave and the number of the at least two frequencies of the transmission wave agree with each other, the correspondence relationship of the frequencies may be easily identified by considering the coincidence of the frequencies of the reception wave and the transmission wave with each other or the coincidence of the magnitude relationships of the frequencies with each other.

According to the aforementioned embodiment, in a case where a number of the one or more frequencies f21, f22 of the reception wave and a number of the at least two frequencies f1, f2 of the transmission wave differ from each other, the estimation portion 425 identifies the correspondence relationship between the one or more frequencies f21, f22 of the reception wave and the at least two frequencies f1, f2 of the transmission wave on the basis of a blank band X existing at at least one of a low range side and a high range side relative to the one or more frequencies f21, f22 of the reception wave within the range of the predetermined frequency band FB.

According to the above-described configuration, even in a case where the amount of the frequency transition caused by the Doppler shift is large to such an extent that the number of the one or more frequencies of the reception wave and the number of the at least two frequencies of the transmission wave disagree with each other, the correspondence relationship between the frequencies may be easily identified by considering the blank band X.

According to the aforementioned embodiment, the at least two wave motions W1, W2 are respectively associated with informations which differ from each other such that the plural wave motions are encoded to include predetermined identification information, and the wave transmitter 411 transmits, as the transmission wave, the encoded plural wave motions.

According to the above-described configuration, it is easily identified with the use of the identification information whether or not the reception wave corresponds to the transmission wave reflected by the object, which serves as the target of the detection, and then returned.

According to the aforementioned embodiment, the distance detection apparatus 200, 201, 202, 203, 204 further includes a correlation processing portion 427 configured to obtain a correlation value corresponding to a degree of similarity of the transmission wave and the corrected reception wave to each other, wherein on the basis of a comparison result of the correlation value and a threshold value with each other, the detection portion 430 detects the information related to the object O in a case where the degree of similarity of the transmission wave and the corrected reception wave to each other is determined to be at a level equal to or greater than a predetermined level.

According to the above-described configuration, the reception wave may be accurately detected as the transmission wave that was reflected by the detection target object and then returned with the use of the correlation value. Thus, the distance to the object which serves as the information related to the object can be detected with accuracy.

According to the aforementioned embodiment, the detection portion 430 detects, as the information related to the object O, a distance to the object O on the basis of a difference between a timing t0 at which the transmission wave was transmitted and a timing t3 at which the reception wave serving as a basis of the corrected reception wave of which the degree of similarity relative to the transmission wave is determined to be at the level equal to or greater than the predetermined level was received.

According to the above-described configuration, the distance to the object may be detected easily.

According to the aforementioned embodiment, the at least two frequencies f1, f2 of the transmission wave are respectively set within ranges of at least two bands B1, B2 formed by virtually dividing the predetermined frequency band FB, and the at least two bands B1, B2 do not overlap each other.

According to the above-described configuration, the at least two frequencies f1, f2 of the transmission wave may be set easily by the band division.

According to the aforementioned embodiment, the wave transmitter 411 and the wave receiver 421 are configured integrally with each other as a transmitting and receiving portion 210 including a single vibrator 211 configured to transmit and receive a sound wave, and the predetermined frequency band FB is set in accordance with specifications of the vibrator 211.

According to the above-described configuration, the configuration for transmitting and receiving the transmission wave and the reception wave can be simplified, and the predetermined frequency band FB may be set easily.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An object detection apparatus comprising:
a processor configured to implement:
a transmitting portion configured to transmit a transmission wave based on at least two frequencies set within a range of a predetermined frequency band;
a receiving portion configured to receive a reception wave based on the transmission wave which returned in response to reflection at an object;
an estimation portion configured to estimate an amount of frequency transition due to Doppler shift between the transmission wave and the reception wave on the basis of a result of a frequency analysis on the reception wave and transmit frequency information indicating a relation between the at least two frequencies of the transmission wave;
a correction portion configured to correct the reception wave to obtain consistency of frequencies with the transmission wave on the basis of an estimation result of the estimation portion; and
a detection portion configured to detect information related to the object on the basis of a relation between the transmission wave and the corrected reception wave corrected by the correction portion.

2. The object detection apparatus according to claim 1, wherein
the transmitting portion transmits, as the transmission wave, a plurality of temporally continuous wave motions including a combination of at least two wave motions of which signal levels reach peaks at the at least two frequencies, respectively, and
on the basis of the result of the frequency analysis and the transmit frequency information, the estimation portion identifies a correspondence relationship between one or more frequencies at which a signal level of the reception wave reaches a peak and the at least two frequencies of the transmission wave, and estimates the amount of the frequency transition on the basis of a difference between the frequencies which correspond to each other.

3. The object detection apparatus according to claim 2, wherein
in a case where a number of the one or more frequencies of the reception wave and a number of the at least two frequencies of the transmission wave are equal to each other, the estimation portion identifies the correspondence relationship between the one or more frequencies of the reception wave and the at least two frequencies of the transmission wave on the basis of coincidence of the one or more frequencies of the reception wave and the at least two frequencies of the transmission wave with each other or on the basis of coincidence of a magnitude relationship between the one or more frequencies of the reception wave and a magnitude relationship between the at least two frequencies of the transmission wave with each other.

4. The object detection apparatus according to claim 3, wherein in a case where a number of the one or more frequencies of the reception wave and a number of the at least two frequencies of the transmission wave differ from each other, the estimation portion identifies the correspondence relationship between the one or more frequencies of the reception wave and the at least two frequencies of the transmission wave on the basis of a blank band existing at at least one of a low range side and a high range side relative to the one or more frequencies of the reception wave within the range of the predetermined frequency band.

5. The object detection apparatus according to claim 3, wherein the at least two wave motions are respectively associated with informations which differ from each other such that the plurality of wave motions are encoded to include predetermined identification information, and the transmitting portion transmits, as the transmission wave, the encoded plurality of wave motions.

6. The object detection apparatus according to claim 2, wherein in a case where a number of the one or more frequencies of the reception wave and a number of the at least two frequencies of the transmission wave differ from each other, the estimation portion identifies the correspondence relationship between the one or more frequencies of the reception wave and the at least two frequencies of the transmission wave on the basis of a blank band existing at at least one of a low range side and a high range side relative to the one or more frequencies of the reception wave within the range of the predetermined frequency band.

7. The object detection apparatus according to claim 6, wherein the at least two wave motions are respectively associated with informations which differ from each other such that the plurality of wave motions are encoded to include predetermined identification information, and the transmitting portion transmits, as the transmission wave, the encoded plurality of wave motions.

8. The object detection apparatus according to claim 2, wherein the at least two wave motions are respectively associated with informations which differ from each other such that the plurality of wave motions are encoded to include predetermined identification information, and the transmitting portion transmits, as the transmission wave, the encoded plurality of wave motions.

9. The object detection apparatus according to claim 1, further comprising:

a correlation processing portion configured to obtain a correlation value corresponding to a degree of similarity of the transmission wave and the corrected reception wave to each other, wherein on the basis of a comparison result of the correlation value and a threshold value with each other, the detection portion detects the information related to the object in a case where the degree of similarity of the transmission wave and the corrected reception wave to each other is determined to be at a level equal to or greater than a predetermined level.

10. The object detection apparatus according to claim 9, wherein the detection portion detects, as the information related to the object, a distance to the object on the basis of a difference between a timing at which the transmission wave was transmitted and a timing at which the reception wave serving as a basis of the corrected reception wave of which the degree of similarity relative to the transmission wave is determined to be at the level equal to or greater than the predetermined level was received.

11. The object detection apparatus according to claim 1, wherein the at least two frequencies of the transmission wave are respectively set within ranges of at least two bands formed by virtually dividing the predetermined frequency band, and the at least two bands do not overlap each other.

12. The object detection apparatus according to claim 1, wherein the transmitting portion and the receiving portion are configured integrally with each other as a transmitting and receiving portion including a single vibrator configured to transmit and receive a sound wave; and the predetermined frequency band is set in accordance with specifications of the vibrator.

* * * * *